United States Patent [19]

Johns

[11] 4,088,060

[45] May 9, 1978

[54] KEY CUTTING DEVICE

[76] Inventor: Tom R. Johns, 510 Cedar St., San Diego, Calif. 92101

[21] Appl. No.: 769,315

[22] Filed: Feb. 17, 1977

[51] Int. Cl.² .............................................. B23C 3/35
[52] U.S. Cl. .................................................. 90/13.05
[58] Field of Search ........................... 90/13.05; 76/110

[56] References Cited

U.S. PATENT DOCUMENTS

| | | | |
|---|---|---|---|
| 3,148,589 | 9/1964 | Le Fever | 90/13.05 |
| 3,495,482 | 2/1970 | Simon | 76/110 |

*Primary Examiner*—Gil Weidenfeld
*Attorney, Agent, or Firm*—William C. Babcock

[57] ABSTRACT

A portable support assembly adapted for use with tubular or barrel keys includes a coded adjustable mount for maintaining the key in a predetermined code location. The mount is secured to one face of a cutter support and includes an eccentric cutter opening through which a support assembly is extended for cutter grooves of selected heights around the periphery of the key. In order to control the depth of cut of each groove the support assembly is provided with a threaded end stop bearing index marks which according to the rotation thereof controls the depth of extension of the cutter through this port.

5 Claims, 14 Drawing Figures

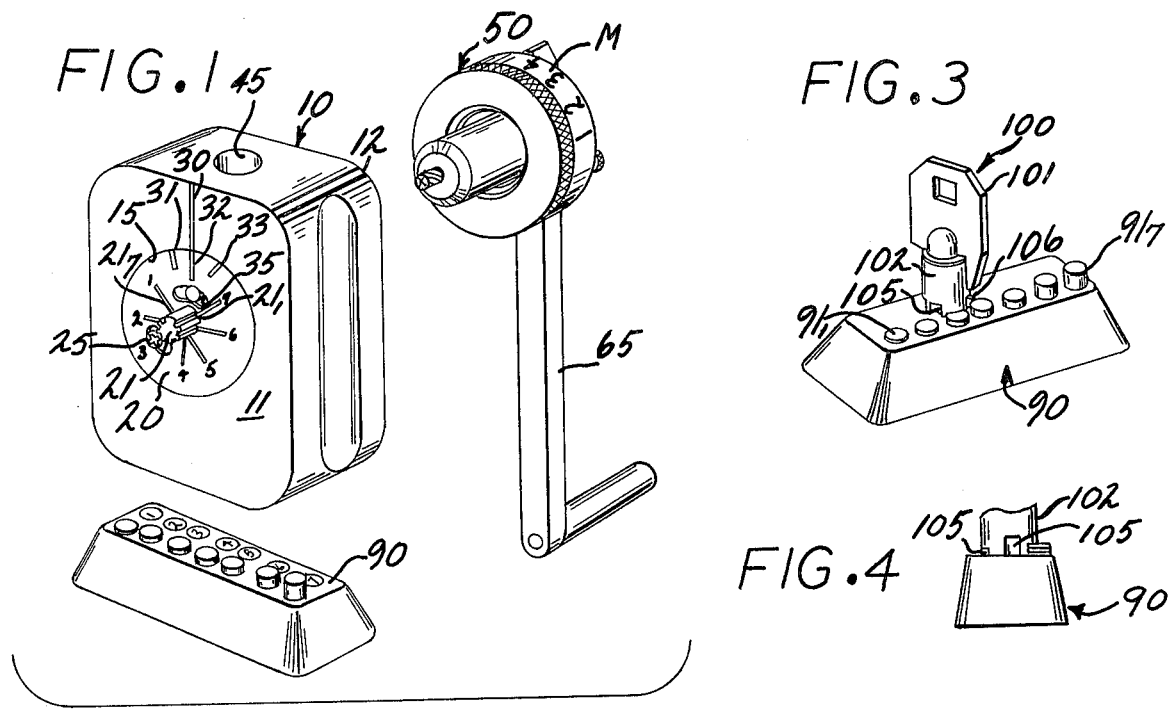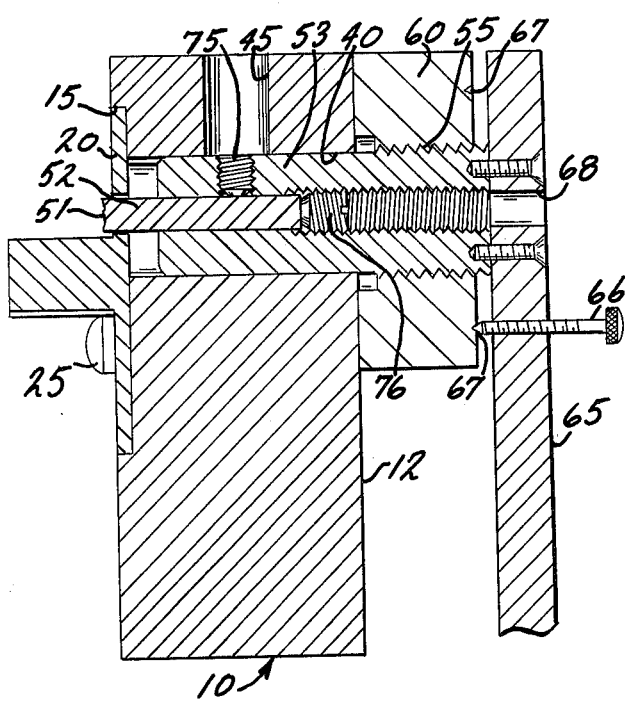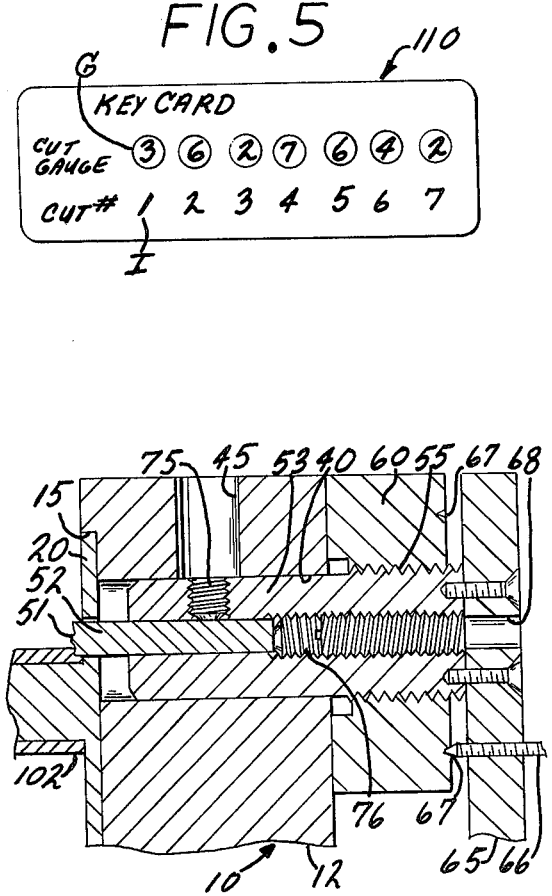

KEY CUTTING DEVICE

BACKGROUND OF THE INVENTION

1. Field of the Invention

The present invention relates to key cutting devices and more particularly to improve cutting devices for duplicating keys from tubular blanks.

2. Description of the Prior Art

Use of tubular or barrel keys has gained wide acceptance in the recent past. In particular it is the wider selection of key codes which is available in a tubular key that has been recognized. One of the disadvantages of a tubular key, however, is the difficulty with which it is reproduced. Unlike flat keys, tubular keys cannot be conveniently aligned for duplication and many devices have been developed in the past to achieve duplication. One such device has been disclosed in U.S. Pat. No. 3,148,589. The device shown in this patent includes a thumb screw controlled depth of cut gauge which is first adjusted by reference to a particular cut on the master key and then is utilized to make the same cut from the duplicate key. The process thus achieved entail the repetitive removal and replacement of the master and the duplicate key.

Typically both the depth of cut and the angular location around the periphery of the key are set according to predetermined codes and are therefore repeatable. Thus once the code of a key is determined it is possible to complete a duplication sequence without the repetitive exchange between the master and the duplicate key. It is exactly this function, and other functions, that are achieved herein.

SUMMARY OF THE INVENTION

Accordingly it is the general purpose and object of the present invention to provide a portable barrel key duplicating device adapted for sequential operations in the cutting of the key.

Other objects of the invention are to provide a duplicate cutter for cylindrical keys wherein preset angular and depth dimensions are achieved.

Yet, further objects of the invention is to provide a cylindrical key duplicating device which is convenient in use, fully adjustable and simple in manufacture.

Briefly, these and other objects are accomplished within the present invention by providing a cutter support having two opposed flat faces, the first face being provided with a circular recess into which a conforming circular mount is inserted. Extending distally from the mount is a splined center post onto which the cylindrical key is placed. The circular mount, furthermore, includes two elongate eccentric openings in the face thereof, one for attachment by way of a set screw and the other for allowing the projection of a cutter extending through the support. The cutter itself extends from a cutter barrel and is located with respect thereto by way of a plurality of set screws. The barrel, in turn, threadably engages a depth of cut gauge which abuts the other surface of the support. It is the advancement of this gauge onto the barrel that selects the depth of cut. To provide for repeatability in each depth of cut, the gauge is scribed with a plurality of angular marks, each mark indicating the corresponding code for the extent of the cutter. At the other end, the barrel includes a crank handle through which a threaded pin extends to engage a plurality of recesses formed in the opposing face of the gauge. These recesses are, in turn, aligned with the scribes and thus secure the gauge at a predetermined point of advancement along the barrel.

BRIEF DESCRIPTION OF THE DRAWINGS

FIG. 1 is a perspective illustration, by parts, of the cutting assembly described herein;

FIG. 2 is a sectional view illustrating the cooperative arrangement of the parts described herein;

FIG. 3 is a perspective illustration of a key decoder useful with the apparatus shown herein;

FIG. 4 is a side view illustration of the decoder shown in FIG. 3;

FIG. 5 is a top view of a coding card useful herein;

FIG. 6 is a detailed sectional view of the cooperative features shown in FIG. 4;

DESCRIPTION OF THE SPECIFIC EMBODIMENT

Figure 7:
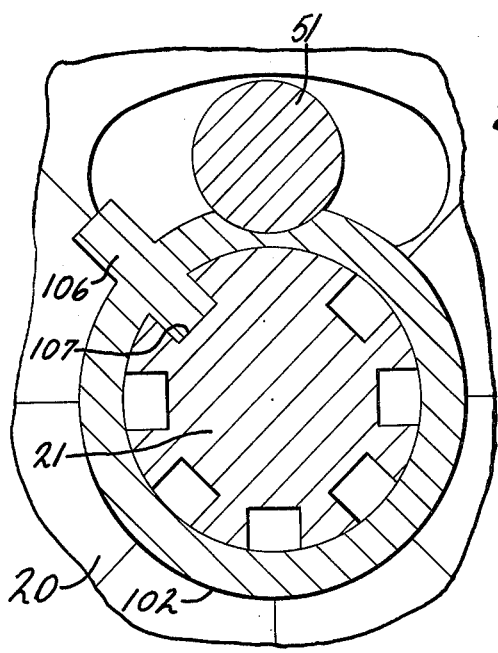
FIG. 7 is a sectional view of a key mounted on the cutter disclosed herein.

As shown in FIG. 1 the present invention utilizes three physical elements for the operation thereof. More specifically a support assembly generally designated by the numeral 10 is conformed to cooperatively engage a cutter assembly generally designated by the numeral 50 to form cuts around the periphery of a cylindrical key which is decoded by way of a decoder 90. More specifically as shown in FIGS. 3, 4 and 5 a key 100 which is to be duplicated, includes a flak or planar handle 101 joined to a cylindrical segment 102. Handle 101 is furthermore conformed to extend partly along one edge thereof over the cylindrical segment 102 to provide an index. Formed around the periphery of the free end of cylindrical segment 102 are a plurality of semicircular cuts 105 which according to their linear length determine the key code. It is to be understood that cuts 105 are disposed around the periphery of the cylindrical segment at predetermined angular positions relative the index of the key. Thus by measuring the linear depth of each cut in sequence around the key periphery the code of the key may be determined. In order to conveniently ascertain the depth of each cut the aforementioned coding block 90 is utilized. Block 90 is provided with a plurality of cylindrical projections $91_1$–$91_7$ of varying height.

It is these cylindrical projections that determine the depth of cut code and are therefore utilized herein. In FIG. 5 a coding card 110 is shown bearing a lower cut number index designated herein by the letter I and a corresponding upper gauge entry designated by the letter G. Thus as the key 100 is sequentially measured for the depth of each cut 105 in a sequence around the periphery thereof the corresponding cut gauge depth, i.e., the corresponding cylindrical stub $91_1$–$91_7$ is entered into the cut gauge row. Having thus determined the sequence of cuts around the key it is then possible to duplicate that same key in a similar sequence. As shown in FIGS. 3 and 7 the key 100 includes an index register 106 aligned in the plane of the handle 101 and disposed on the exterior periphery of the cylindrical segment with a corresponding interiorally directed index register 107 on the interior of that same segment. It is by way of this interiorally directed index register 107 that the key is aligned.

Referring back to FIG. 1 the support assembly 10 includes two opposed faces 11 and 12, face 11 being provided with a circular recess 15 conformed to receive a circular mount 20. Extending to the exterior from mount 20 and aligned centrally therewith is a support spline 21 including a plurality of grooves $21_1 - 21_7$ formed on the exterior thereof. It is these grooves that engage the aforementioned index register 107 and therefore select the angular position of the key on the mount 20. Mount 20, in turn, is secured relative the support 11 by way of a screw 25 which extends through a first arcuate opening 26 to align the mount relative and index mark 30 formed on the face 11. A corresponding set of alignment marks 31, 32 and 33 on the periphery of mount 20 provides the necessary visual index for setting the location of the mount. It is to be noted that more than one alignment mark is provided herein, it being intended to accommodate various coding arrangements or various angular dispositions of cuts around the periphery of the key. While only three alignment marks are shown herein it is to be understood that more than the number shown can be utilized for the purposes herein.

Disposed radially inward on the face of the circular mount 20 is yet another arcuate opening 35 adapted to permit the extension of a cutter (to be described) along the spline 21.

By further reference to FIGS. 1 and 2 the cutter assembly 50 comprises a cutter 51 insertable into a central bore 52 formed on the interior of a support barrel 53. Barrel 53 is, in turn, conformed for telescopic receipt within the interior of a bore 40 extending across the support assembly 10 between faces 11 and 12, which is disposed within the support assembly 10 to provide alignment of the cutter 51 within the elongate opening 35. Thus the extent of insertion of barrel 53 into bore 40 controls the extent to which the cutter 51 extends beyond the face of the mount 20. In order to control the amount of this extension, and therefore to provide a controlled correspondence between the depth of cut determined by the coding block 90, and the actual cut made, barrel 53, at the other end thereof, includes a threaded segment 55 engaging a stop gauge 60.

The threaded end of barrel 53 furthermore extends beyond the stop gauge 60 to be secured to a handle 65 thereat. Handle 65, if furthermore provided with a manually controlled set screw 66 which extends towards the opposing face of gauge 60 to be received in a plurality of index detents or recesses 67 formed thereat. More specifically as shown in FIG. 1 a plurality of depth of cut marks M is provided around the exterior periphery of gauge 60. It is these marks that are aligned with the corresponding recesses 67 and it is by way of these marks that the depth of cut is selected.

Thus, by utilizing a predetermined pitch on the threaded segment 55 and a corresponding angular position of the marks M and recesses 67 the depth of cut determined by way of the posts or cylinders $91_1 - 91_7$ is duplicated. In each instance, it is the abutting relationship of gauge 60 relative the face 12 that controls the depth of cut.

In order to adjust for wear on the cutter 51 and to make the initial setting, barrel 53 is provided with two set screws 75 and 76; set screw 76 being insertable within the bore 52 while set screw 75 extends radially through the barrel to secure the cutter therein. To provide for a convenient access to these set screws, the support assembly 10 includes a vertical bore 45 and the handle assembly 65 includes an opening 68 aligned with the central bore 52.

Figure 8:
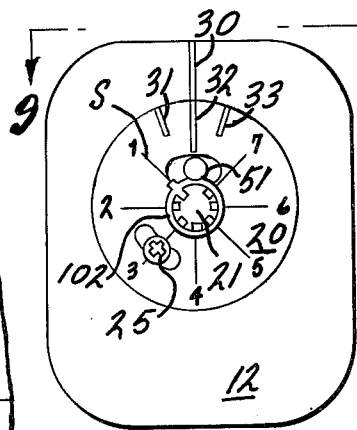
FIG. 8 is a plan view of the cutter assembly disclosed herein.

As shown in FIGS. 7 and 8, the disposition of the key barrel 102 on the splined post 21 is angularly controlled by the internally directed index 107. This index, in turn, aligns with the flat of the key and also the externally directed index 106. Thus by providing a plurality of grooves or splines on post 21, a set arrangement of angular orientations is developed. In a counterclockwise orientation, a set of scribed marks S numbered 1–7 on the face of the mount 20, provides the necessary visual indication of the particular key alignment. It is with respect to these scribed marks that the key is advanced and a corresponding adjustment is made on the stop gauge 60 according to the code relationship set out on the coding card 110. Thus, the alignment of the tee 100 relative the cutter 51 is conveniently controlled by virtue of the splined mount 21 and the disposition thereof in the support assembly 10. As the key is progressively duplicated the angular location of each cut is therefore exactly controlled and the depth of cut is similarly set by the stop gauge 60.

In order to provide for initial adjustment and to compensate for wear, gauge 60 may include a reference mark at which the cutter 51 is to extend exactly with the exterior surface of mount 20. For this reason the two set screws 75 and 76 are provided; set screw 75 providing the requisite securing of the cutter 51 within bore 52, while set screw 76 providing the necessary advancement thereof.

Figure 9:
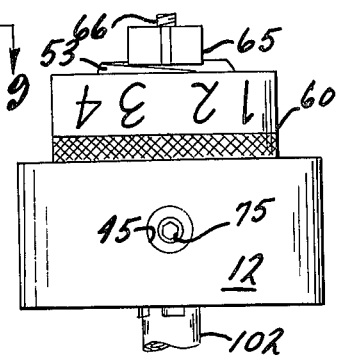
FIG. 9 is a top view taken along plane 9—9 of FIG. 8.
Figure 10:
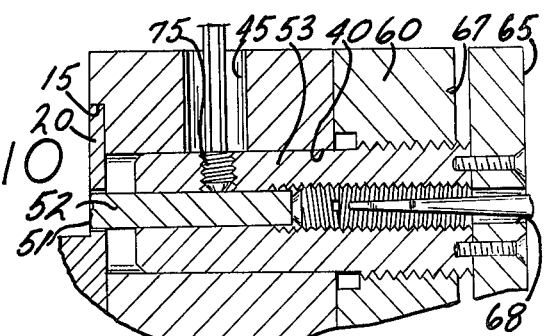
FIG. 10 is yet another sectional view illustrating the degree of advancement of the cutter useful herein.

As shown in FIGS. 9 and 10, this adjustment may be made through the corresponding opening provided either by a screw driver or an Allen wrench insertable through bore 45 and opening 68.

Figure 11:
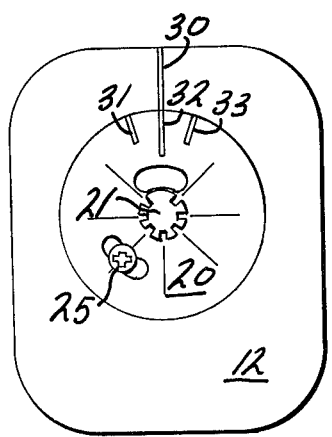
FIGS. 11, 12 and 13 each illustrate, in plan view the various degrees of adjustment of a circular mount useful with the invention herein.
Figure 12:
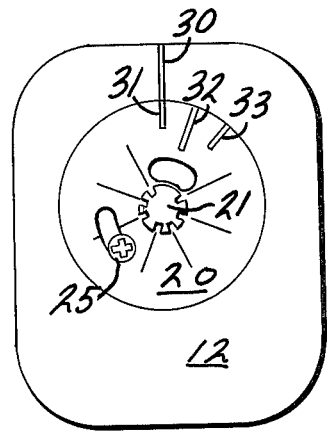
Figure 13:
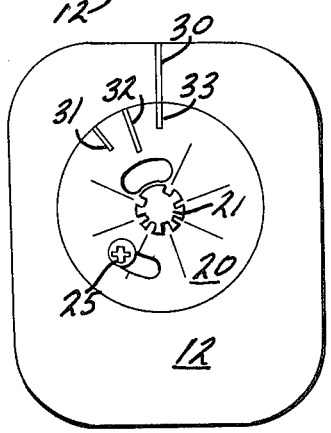

To further accommodate code variations around the periphery of the key, the aforementioned scribed marks 31, 32 and 33 are illustrated in FIGS. 11, 12 and 13. More specifically, in FIG. 11 the normal alignment of the mount 20 relative the support assembly 10 is achieved by aligning the scribed marks 32 with the reference 30. Alternatively scribed mark 31 may be aligned, as shown in FIG. 12, with the scribed mark 30 or, in fact, scribed mark 33 may be so aligned. In each instance the elongate dimension of the arcuate opening 25 accommodates this adjustment, the maintenance thereof provided by way of the aforementioned set screw 26.

Figure 14:
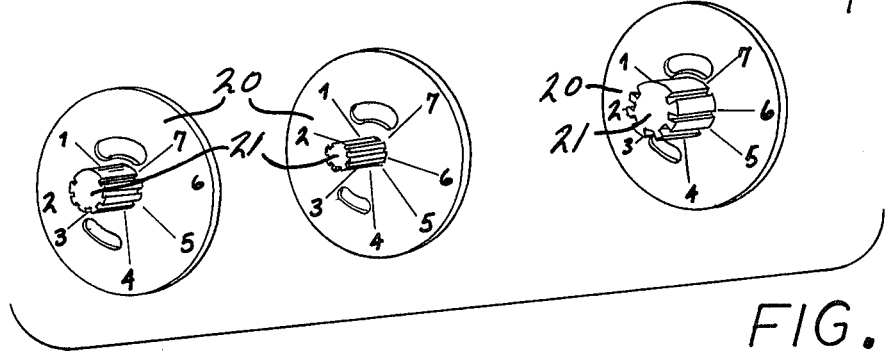
FIG. 14 illustrates in perspective an ensemble of mounts useful with the invention herein.

Further variations of the key configuration may dictate variations in the diameter of the posts 21. For this reason, an ensemble of mount 20 is shown in FIG. 14. More specifically, three various sizes of the post 21 are shown, each accommodating a particular interior diameter of the cylinder 102.

Some of the many advantages of the present invention should now be readily apparent. The invention provides by way of an assembly of parts, a convenient device for use in duplicating cylindrical keys. This arrangement of parts is furthermore complemented by a coding card for recording the sequence of cuts around the periphery of the key and a measuring device for making the initial measurements. In each instance very simple structural elements are utilized with the attendant convenience in use and simplicity of manufacture.

Obviously many modifications and variations to the above disclosure can be made without departing from the spirit of the invention. It is therefore intended that the scope of the invention be determined solely dependent on the claims hereto.

I claim:

1. Apparatus for cutting a cylindrical key blank according to a predetermined sequence of peripheral cuts comprising;

a support assembly including a cutter bore extending between two lateral sides thereof, a splined key mount including a planar mounting portion having a splined shaft projecting therefrom and an elongate opening therein at a predetermined space from said shaft, said splined shaft having a plurality of splines disposed at predetermined peripheral intervals, said splined key mount being supported on one side of said support assembly with its elongate opening being in alignment with the axis of the cutter bore, a cutter assembly including a cylindrical barrel having a central bore, one portion of said cylindrical barrel being slidably received in the cutter bore of said support assembly, a rotary cutter being mounted in the central bore of said cylindrical barrel and extending through the elongate opening of said spined key mount, a depth gage being in threaded engagement on the other end of said cylindrical barrel for abutting the other of said lateral sides of the support assembly thereby limiting the axial advancement of the barrel relative to the support assembly, and detent means associated with said barrel and said depth gage for selectively threadingly adjusting the gage on said barrel to control the depth of each of the peripheral cuts made by the cutter in the key blank.

2. Apparatus according to claim 1 wherein:

said detent means includes an orthogonally disposed handle extending from the threaded portion of said barrel, a plurality of detents formed on said gage at arcuate increments corresponding to said increments of cutter advancement and a set screw threadably secured in said handle for engagement in said detents.

3. Apparatus according to claim 1 wherein:

said elongate opening comprises an arcuate planform for accommodating arcuate adjustment of said mount relative said cutter.

4. Apparatus according to claim 3 wherein:

said mount includes a circular support disc disposed at one end thereof; and said support assembly includes a circular recess conformed to receive said support disc.

5. Apparatus according to claim 4 wherein:

said support disc includes a plurality of scribes for providing visual indicating of said sequence; and said gage includes a plurality of marks in alignment with said detent for providing visual indication of said advancement increment.

* * * * *